Figure 1:
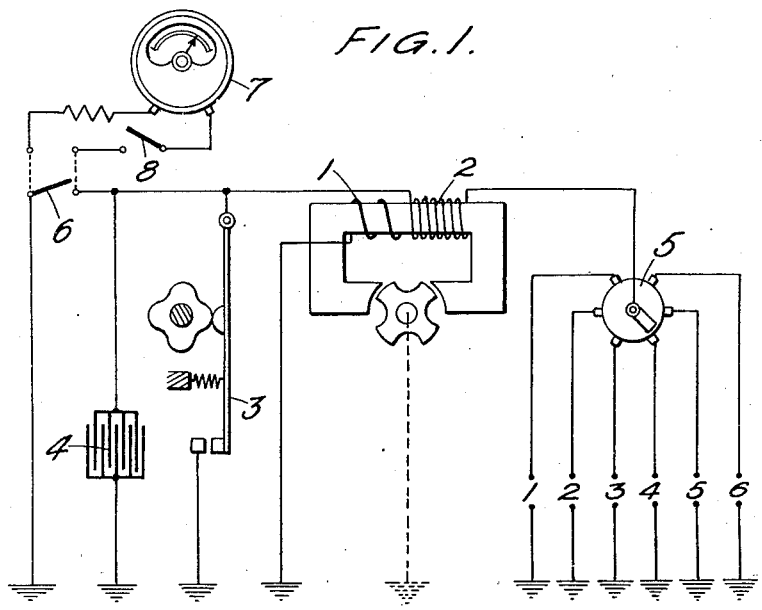

Nov. 10, 1936.  W. G. BIRD  2,060,721
ELECTRICAL SPEED INDICATOR AND REVOLUTION COUNTER
Filed Aug. 22, 1934  2 Sheets-Sheet 1

William George Bird
Inventor,
Per, C. Aye Draper
Atty.

Nov. 10, 1936.          W. G. BIRD          2,060,721
ELECTRICAL SPEED INDICATOR AND REVOLUTION COUNTER
Filed Aug. 22, 1934      2 Sheets-Sheet 2

Inventor.
William G. Bird
Per, C. [signature]
Atty

Patented Nov. 10, 1936

2,060,721

UNITED STATES PATENT OFFICE 2,060,721

ELECTRICAL SPEED-INDICATOR AND REVOLUTION-COUNTER

William George Bird, Redland, Bristol, England

Application August 22, 1934, Serial No. 741,019
In Great Britain August 26, 1933

8 Claims. (Cl. 123—148)

This invention relates to electrical speed-indicating means, including speed-indicators and revolution-counters, and has for its object to provide means for determining the speed of rotating parts of internal-combustion engines having an ignition system of the kind hereinafter set forth, or for determining the total number of revolutions made in a given period of time by the said rotating parts.

The invention is applicable to any internal-combustion engine provided with an electrical ignition system of the kind in which, or in some part of which, there is generated a pulsating or alternating electrical current or E. M. F. whereof the frequency is rigidly proportional to the speed of the rotating parts of the engine. Such is the case with, for example, the well known "high tension magneto" system of ignition and also with the well known "battery and high-tension coil" system commonly employed in automobile engines.

The invention comprises a speed-indicating device wherein the speed of a rotating part of the engine is determined by measurement of the frequency of the above-mentioned electrical current or E. M. F. and also comprises a revolution-counting device wherein the total number of revolutions made in any given period of time by such a rotating part is determined by measurement of the total number of pulsations or cycles of the electrical current or E. M. F. in that same period. Such a correlation, two-by-two, of the above four quantities is evidently valid by reason of the strict proportionality at all times between the said frequency and the said speed.

The invention also comprises arrangements wherein either or both of the above devices is or are associated electrically with the ignition-system in such a manner that the operation of these devices does not sensibly affect the normal functioning of that system or require large structural alterations thereto. The devices are furthermore constructed and operated in such a manner that various adjuncts commonly associated with existing speed-indicators and revolution-counters, for example flexible shafting or separate electrical generators mechanically coupled to the rotating parts of the engine, are not required. Thus the invention offers substantial advantages over existing speed-indicators and revolution-counters on the grounds of simplicity, lightness, reliability, and cheapness, especially when such instruments are required to operate at a distance from the engine.

Various embodiments of the invention by way of example will now be described with reference to the accompanying diagrammatic drawings, in which:—

Figure 2:
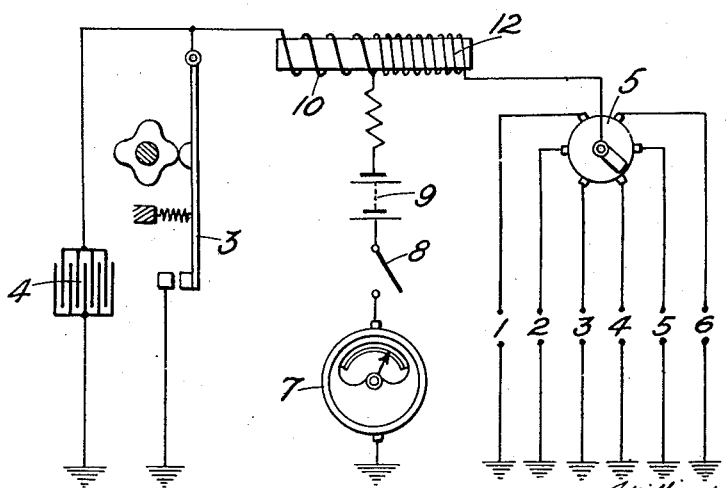
Figure 3:
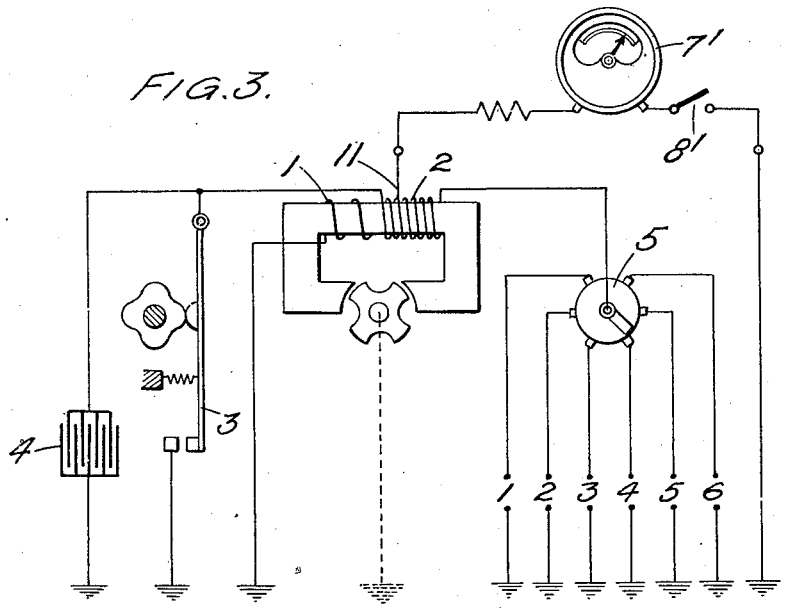
Figure 4:
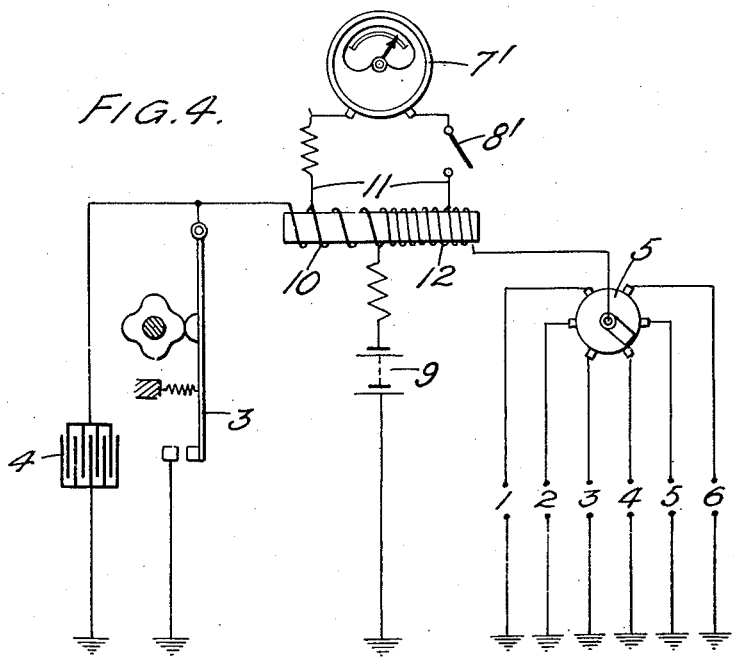

Figs. 1 and 3 illustrate two embodiments of the invention applicable to cases where the "high tension magneto" system of ignition is employed, and Figs. 2 and 4 illustrate two embodiments of the invention applicable to cases where the "battery and high tension coil" system of ignition is employed.

In Fig. 1 a high tension magneto is shown diagrammatically with its primary and secondary windings 1, 2, a contact breaker 3, condenser 4 and distributor 5 as is normally the case in such systems. A switch 6 is incorporated of which one terminal is connected electrically to the primary coil 1 of the magneto and the other to earth (or its equivalent), the shunt circuit so formed being electrically in parallel with that portion of the primary circuit which connects the primary coil to earth through the contact-breaker 3. The function of this shunt circuit is, of course, to provide a convenient means for stopping and starting the engine, since when this circuit is closed by the switch 6 the contact-breaker 3 is virtually short-circuited and the magneto and engine cannot function. When on the other hand, the said switch is open, no current passes through the shunt circuit and the magneto and engine may operate. In the present embodiment of the invention, however, a speed indicating and/or revolution counting meter 7 is connected preferably through a local switch 8, across the terminals of the switch 6, or in an equivalent position electrically. The component device or devices of this meter are constituted internally so as to have a very large electrical impedance to an applied E. M. F. Under these conditions, a small "leakage" current can still pass through the shunt circuit and meter 7 when the switch 6 is open (and the switch 8 closed) and the magneto and engine are operating, this leakage current being pulsating in nature with a frequency proportional to the speed of the rotating parts of the engine and with a maximum amplitude during periods when the contact-breaker 3 is in the "break" position. By making the electrical impedance of the component device or devices of the meter 7 sufficiently large, the leakage current is reduced to such a small amount that it is insufficient to interfere with the normal functioning of the magneto and yet is sufficient to actuate the meter, the whole arrangement thus operating in every way in the manner desired.

The speed-indicating device for such a meter 7 consists of a device in which the above-mentioned current or a corresponding E. M. F. or some part or derivative thereof, is applied to produce a mechanical response which is dependent upon the frequency of the current or E. M. F. but not sensibly upon its amplitude or any other factor. Furthermore the device is so constructed that the power necessary to operate it is small. The mechanical response may conveniently be by angular deflection of a pointer or pen traversing a dial, chart or equivalent device, which latter may then be calibrated directly in terms of the speed of the rotating parts of the engine. The device is preferably also constituted so that it may be adjusted to respond correctly even if the electrical wave-form of the applied E. M. F. or current departs very widely from sinusoidal form, and so that the response is not sensibly affected by small changes in such wave-form. Thus the frequency-responsive device may be any electrical frequency meter of known type possessing the above mentioned properties. Such a device of the kind described in the specification of my U. S. A. patent application Serial No. 734,051, filed July 6, 1934, may conveniently be employed.

The revolution-counting device for such a meter 7 comprises for instance, an alternating current synchronous motor which is capable of being operated by the above mentioned current or E. M. F. or some part or derivative thereof, and is so constructed that its power-consumption is small. This motor actuates a mechanical counter of some known type, and in view of the synchronism which exists substantially at all times between the motor and engine, it is apparent that the said counter may be calibrated directly in terms of the total number of revolutions made in a given period of time by the engine. The motor is preferably one operating on the principle of the well known "phonic wheel", or alternatively on the principle of one or other of the motors employed in the well known electric clocks designed to operate from controlled frequency alternating-current mains.

The speed-indicating device and the revolution-counting device may be provided separately if desired, either device being then incorporated in a suitable meter which may, if necessary, be located at a distance from the engine. Alternatively the two devices may be connected electrically together, either in series or parallel as convenient, and incorporated in one and the same meter.

In Fig. 2, the meter 7 is incorporated in the primary circuit of the high-tension coil ignition system by connecting it electrically between the battery 9 and earth, as shown, or between the battery and primary winding 10 of the coil or in any equivalent position of which the effect is to place it in series electrically with the primary circuit so that it is traversed by the pulsating electrical current generated in that circuit. The meter 7 will function in the manner desired, since the electrical pulsations produced by the contact-breaker 3 are at a frequency proportional to the speed of the rotating parts of the engine. In the present embodiment, however, the component device or devices of the meter 7 are constituted internally so as to have a very small impedance to an applied E. M. F. and so that the existing electrical impedance of the primary circuit is not sensibly increased by the connection. In particular it is desirable that the time-constant, in the electrical sense, of the primary circuit should not be sensibly increased even though its apparent ohmic resistance is of necessity greater on account of the power absorbed in the meter. This desirable result may be effected by arranging that the time-constants of the devices, or their resultant time-constant when associated together, are or is the same as the designed time-constant of the primary circuit.

Where the ignition is by battery and high-tension coil or by a high-tension magneto having stationary primary and secondary coils (as is the case of the well-known "polar-inductor" type of magneto), the connection of the meter may conveniently be made by means of a tapping or tappings 11, in the electrical sense, upon either the primary or secondary coils, or upon both of these coils.

In Fig. 3 such an alternative arrangement is indicated, the meter 7' being connected by a tapping 11 across a part of the secondary winding 2.

In Fig. 4 a similar alternative arrangement has the meter 7' connected by tappings 11 across parts of both the primary and secondary windings 10 and 12. In such cases the component device or devices of the meter 7' is or are then constituted internally so as to have an electrical impedance which is sufficiently great to prevent the leakage current through the meter becoming large enough to interfere with the normal functioning of the ignition system. The meter 7' then, in effect, responds to the frequency of the E. M. F. generated in the primary or secondary coils by the pulsating magnetic flux in the magnetic circuit upon which the said coils are wound, which frequency is again proportional to the speed of the rotating parts of the engine, so that the meter functions as before in the desired manner.

In all cases, it will be noted the meter 7 or 7' is connected electrically to some part of the electrical circuit of the ignition-system in which the requisite pulsating or alternating current or E. M. F. obtains the connection being made in such a manner that the component device or devices of the meter can be actuated by this current or E. M. F. or by some part or derivative thereof, without causing any substantial change in the electrical conditions normally existing in the circuit and without necessitating large structural alterations to the system generally. As will be seen, this desired effect may be brought about in a number of different ways depending, inter alia, upon the nature of the ignition-system employed.

What I claim is:—

1. Speed indicating means for an internal combustion engine, comprising in combination with a high-tension ignition system including the usual primary and secondary windings, interrupter device and source of current, frequency-sensitive measuring means connected to a part of the said system wherein there exists a pulsatory electrical E. M. F. with a frequency proportional to the speed of the engine.

2. Speed indicating means for an internal combustion engine, comprising in combination with a high-tension ignition system including the usual primary and secondary windings, interrupter device and source of current, frequency-sensitive measuring means connected in series with one of the said windings.

3. Speed indicating means for an internal combustion engine, comprising in combination with a high-tension ignition system including the usual primary and secondary windings, interrupter device and source of current, frequency-sensitive measuring means connected in parallel with part at least of one of the said windings.

4. Speed indicating means for an internal combustion engine, comprising in combination with a high-tension magneto having a usual ignition switch associated with its primary winding, frequency-sensitive measuring means of high electrical impedance connected across the said ignition switch.

5. Speed indicating means for an internal combustion engine, comprising in combination with a high-tension ignition coil having a battery connected in series with its primary winding, frequency-sensitive measuring means of low electrical impedance connected in series with the said battery and primary winding.

6. Speed indicating means for an internal combustion engine, comprising in combination with a high-tension ignition device with primary and secondary windings, frequency-sensitive measuring means of high electrical impedance connected in parallel with parts of the said primary and secondary windings.

7. Speed indicating means for an internal combustion engine, comprising in combination with a high-tension ignition system including the usual primary and secondary windings, interrupter device and source of current, a frequency meter connected to a part of the system in which there exists a pulsatory electrical E. M. F. with a frequency proportional to the speed of the engine, the said frequency meter being adapted for giving a mechanical response which is little affected by the amplitude, wave form and like factors of the pulsatory E. M. F.

8. Revolution counter for an internal combustion engine, comprising in combination with a high-tension ignition system including the usual primary and secondary windings, interrupter device and source of current, a self-starting synchronous motor with a small power consumption connected to a part of the said system wherein there exists a pulsatory electrical E. M. F. with a frequency proportional to the speed of the engine and counting means driven by the said motor.

WILLIAM GEORGE BIRD.